（12） United States Patent
Tsuchiya et al.

(10) Patent No.: US 10,609,774 B2
(45) Date of Patent: Mar. 31, 2020

(54) LIGHTING CIRCUIT AND VEHICLE LAMP

(71) Applicant: KOITO MANUFACTURING CO., LTD., Tokyo (JP)

(72) Inventors: Toshiyuki Tsuchiya, Shizuoka (JP); Takao Muramatsu, Shizuoka (JP); Takeshi Toda, Shihizuoka (JP)

(73) Assignee: KIOTO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/748,997

(22) PCT Filed: Jul. 1, 2016

(86) PCT No.: PCT/JP2016/069659
§ 371 (c)(1),
(2) Date: Jan. 30, 2018

(87) PCT Pub. No.: WO2017/018128
PCT Pub. Date: Feb. 2, 2017

(65) Prior Publication Data
US 2019/0008010 A1    Jan. 3, 2019

(30) Foreign Application Priority Data
Jul. 30, 2015  (JP) .................... 2015-150520

(51) Int. Cl.
*H05B 33/08*   (2020.01)
*B60Q 1/04*    (2006.01)
(Continued)

(52) U.S. Cl.
CPC .......... *H05B 33/0842* (2013.01); *B60Q 1/00* (2013.01); *B60Q 1/04* (2013.01); *B60Q 1/34* (2013.01);
(Continued)

(58) Field of Classification Search
CPC ............ H05B 33/0809; H05B 33/0815; H05B 33/0827; H05B 33/0833; H05B 33/0845;
(Continued)

(56) References Cited

U.S. PATENT DOCUMENTS 9,538,601 B1 *   1/2017   Mangtani .......... H05B 33/0854
2007/0085494 A1   4/2007   Takeda et al.
(Continued)

FOREIGN PATENT DOCUMENTS

CN    103139983 A    6/2013
JP    2005-072546 A  3/2005
(Continued)

OTHER PUBLICATIONS

International Search Report of the International Searching Authority issued in PCT/JP2016/069659 dated Sep. 20, 2016 (3 pages).
(Continued)

*Primary Examiner* — Tung X Le
(74) *Attorney, Agent, or Firm* — Osha Liang LLP

(57) ABSTRACT

A lighting circuit includes a voltage converter configured to receive a DC voltage to perform voltage conversion and supply a drive current to a light source unit including a light emitting element, a bypass switch configured to form a bypass path through which the drive current bypasses the light emitting element, and a controller configured to control the voltage converter and the bypass switch. The light source unit includes a plurality of light emitting elements connected in series. The bypass path includes at least one bypass switch which are connected in parallel with at least one of the light emitting elements. When turning on the light emitting element of the light source unit, the controller controls the voltage conversion to start in a state where the bypass switch is turned on, and then, turns off the bypass switch to turn on the light emitting element.

7 Claims, 6 Drawing Sheets

(51) Int. Cl.
*B60Q 1/34* (2006.01)
*B60Q 1/00* (2006.01)
*B60R 16/03* (2006.01)
*B60Q 1/30* (2006.01)

(52) U.S. Cl.
CPC ........... *B60R 16/03* (2013.01); *H05B 33/083* (2013.01); *B60Q 1/30* (2013.01); *H05B 33/0815* (2013.01)

(58) Field of Classification Search
CPC .............. H05B 33/0881; B60Q 1/0408; B60Q 1/1407; B60Q 1/1415; B60Q 1/143
USPC .................. 315/77, 82, 185 R, 193, 306, 307
See application file for complete search history.

(56) References Cited

U.S. PATENT DOCUMENTS

| | | |
|---|---|---|
| 2013/0069545 A1 | 3/2013 | Seo et al. |
| 2013/0134895 A1 | 5/2013 | Kanamori et al. |
| 2014/0265890 A1 | 9/2014 | Ito et al. |
| 2015/0158414 A1 | 6/2015 | Ohta |
| 2015/0163871 A1 | 6/2015 | Takeshi et al. |
| 2015/0173133 A1* | 6/2015 | Seki .................... H05B 33/0818 315/185 R |
| 2015/0257225 A1* | 9/2015 | Yu ....................... H05B 33/0827 315/122 |
| 2016/0353531 A1* | 12/2016 | Conner ................ H04N 5/2354 |
| 2017/0282782 A1* | 10/2017 | Baker ................. H05B 33/083 |

FOREIGN PATENT DOCUMENTS

| | | |
|---|---|---|
| JP | 2012-228076 A | 11/2012 |
| JP | 2015-110357 A | 6/2015 |

OTHER PUBLICATIONS

Written Opinion of the International Searching Authority issued in PCT/JP2016/069659 dated Sep. 20, 2016 (3 pages).
Office Action issued in Chinese application No. 2016.80044794.9, dated Dec. 21, 2018 (17 pages).
Extended Search Report issued in European Application No. 16830233.9, dated Feb. 28, 2019 (8 pages).

* cited by examiner

LIGHTING CIRCUIT AND VEHICLE LAMP

TECHNICAL FIELD

The present invention relates to a lighting circuit and a vehicle lamp which includes the lighting circuit and a light source unit, and particularly, to an operation of turning on and off lighting.

BACKGROUND ART

A vehicle lamp such as a vehicle headlamp, a turn signal lamp, and the like, includes a light emitting element which is a semiconductor light source such as a Light Emitting Diode (LED) or a light emitting element which is a filament bulb.

Patent Document 1 discloses a circuit in which a bypass circuit is provided with respect to each of a plurality of LEDs connected in series, and a part of the LEDs are turned off by turning on a bypass path.

PRIOR ART DOCUMENTS

Patent Document

Patent Document 1: JP-A-2015-110357

SUMMARY OF INVENTION

Problems to be Solved by Invention

When a part or all of light emitting elements are to be turned on from a state where the light emitting elements are all off, the light emitting elements are desired to be turned on quickly to some extent without instantaneous lighting with a constant timing every time. When the light emitting elements are all to be turned off from a state where a part or all of the light emitting elements are on, the light emitting elements are also desired to be turned off instantaneously.

Accordingly, an object of the present invention is to propose an appropriate control sequence for turning-on and turning-off lighting.

Means For Solving Problems

A lighting circuit according to the present invention includes: a voltage conversion unit which is configured to receive a DC voltage to perform voltage conversion and supply a drive current to a light source unit including a light emitting element; a bypass switch which is configured to form a bypass path through which the drive current bypasses the light emitting element; and a control unit which is configured to control the voltage conversion unit and the bypass switch, wherein when turning on the light emitting element of the light source unit, the control unit controls the voltage conversion to start in a state when the bypass switch is turned on, and then, turns off the bypass switch to turn on the light emitting element.

For example, since the voltage conversion is started in a state where the bypass path is formed by turning on the bypass switch, the drive current does not flow to the light emitting element of the light source unit even if the drive voltage increases instantaneously.

In the lighting circuit, when turning off the light emitting element of the light source unit, the control unit controls the voltage conversion to stop after turning on the bypass switch.

The light source unit is all turned off at a time point when the bypass path is closed via the bypass switch. Voltage conversion operation of the voltage conversion unit stops when or after the bypass path is closed.

In the lighting circuit, the light source unit may include a plurality of light emitting elements are connected in series, and the bypass path includes a plurality of bypass switches which are connected in parallel with the light emitting elements and are connected in series. When turning on all or a part of the light emitting elements in the light source unit, the control unit controls the voltage conversion to start in a state of where all of the bypass switches are turned on, and then, turns off all or a part of the bypass switches.

In a case where the light source unit includes a plurality of light emitting elements such as LEDs connected in series, for example, by providing bypass switches connected in parallel with respective light emitting elements, it is possible to turn on and off each of the light emitting elements by the bypass switches. In such a case, when turning on all or a part of the light emitting elements from a state where the light source unit is off, all of the bypass switches are turned on, such that bypass paths corresponding to the entire light source unit are closed.

A lighting circuit according to the present invention includes a voltage conversion unit which is configured to receive a DC voltage to perform voltage conversion and supply a drive current to a light source unit which includes a plurality of light emitting elements connected in series; a bypass path which includes a plurality of bypass switches which are connected in parallel with the light emitting elements and are connected in series; and a control unit which is configured to control the voltage conversion unit and the bypass switch, wherein when turning off all of the light emitting elements from a state where at least one light emitting element is on, the control unit controls the voltage conversion to stop after turning on all of the bypass switches.

In a case where the light source unit includes a plurality of light emitting elements such as LEDs connected in series, for example, by providing bypass switches connected in parallel with respective light emitting elements, it is possible to turn on and off each of the light emitting elements via the bypass switches. In such a case, the light source unit is all turned off at a time point when the bypass path is closed via the bypass switch. Voltage conversion operation of the voltage conversion unit stops at the same time as or after the bypass path is closed.

In the lighting circuit, when turning off all of the light emitting elements, the control unit may control the voltage conversion to stop in a case where no turning-on instruction is input even after a predetermined time elapses from turning on of all of the bypass switches.

There is a case where a turning-on instruction is input immediately after a turning-off instruction. In such a case, it is possible to respond instantly if the voltage conversion is not stopped. Meanwhile, the power loss is large to continue the voltage conversion and an output of the drive current unnecessarily. Accordingly, the control unit waits only for a predetermined time until the voltage conversion is stopped.

A vehicle lamp according to the present invention is a vehicle lamp including the light source unit including the plurality of light emitting elements connected in series and the lighting circuit.

Effects of Invention

According to the present invention, since the voltage conversion is started in a state where the bypass path is closed when the light source unit is turned on, no instantaneous lighting will occur, and lighting operation of high quality can be realized.

DESCRIPTION OF EMBODIMENTS

<1. Configuration of Vehicle Lamp>

Figure 1:
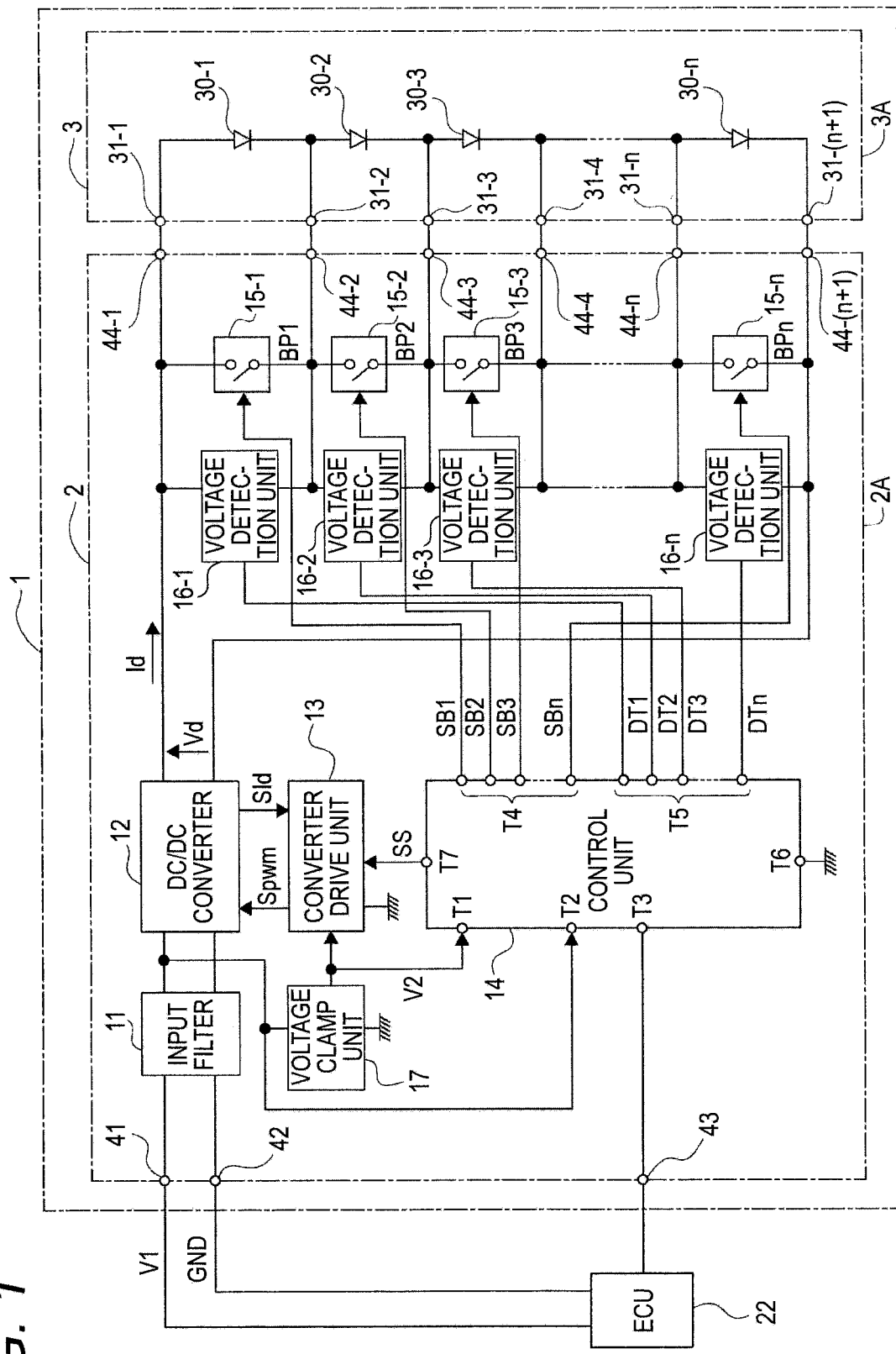
FIG. 1 is a block diagram of a vehicle lamp according to an embodiment of the present invention.

Hereinafter, a vehicle lamp according to an embodiment will be described with reference to drawings. FIG. 1 shows a vehicle lamp 1 according to an embodiment and relevant parts thereof. The vehicle lamp 1 can be appropriately, applied to various lamps such a vehicle headlamp, a turn signal lamp, a back light, and the like.

The vehicle lamp 1 includes a lighting circuit 2 and a light source unit 3.

The lighting circuit 2 is configured to receive power supply from a battery of a vehicle (not shown) and is connected communicably to an Electronic Control Unit (ECU) 22 which is provided in a vehicle side and performs entire electrical control.

In this configuration example, a line of a power source voltage V1 and a ground line from a battery are connected via the ECU 22, and the ECU 22 is capable of controlling power supply to the lighting circuit 2. However, this is merely an example, and the power source line of the power source voltage V1 and the ground line from the battery may be connected to the lighting circuit 2 without using the ECU 22.

The ECU 22 may be provided inside the vehicle lamp 1.

In the light source unit 3 of the vehicle lamp 1, n LEDs represented as LEDs 30-1 to 30-$n$ are connected in series as light emitting elements which are semiconductor light sources.

The LEDs 30 (30-1 to 30-$n$) of the light source unit 3 are driven to emit light by being supplied with a constant-current controlled drive current Id from the lighting circuit 2.

The LEDs 30-1 to 30-$n$ are, for example, arranged in a row.

Figure 2:
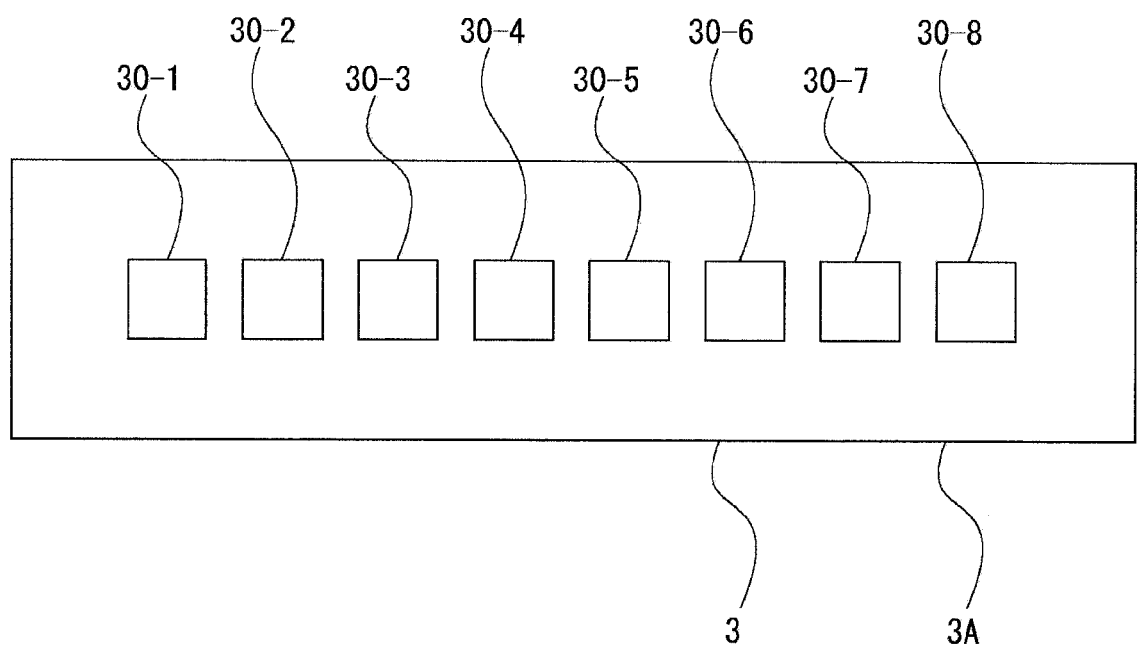
FIG. 2 is an illustrative diagram of an arrangement of light emitting elements according to the embodiment.

FIG. 2 schematically shows a state where, when n=8, eight LEDs 30-1 to 30-8 are arranged on a LED substrate 3A in a row.

In this way, the LEDs 30-1 to 30-8 are arranged in a row which is appropriate for sequential lighting when applied to a turn signal lamp. Also, when applied to a high beam light source of a headlamp, precise control of a high beam pattern of the headlamp can be realized by individually turning on and off each of the LEDs 30-1 to 30-8.

As shown in FIG. 1, the lighting circuit 2 includes an input filter 11, a DC/DC converter 12, a converter drive unit 13, a control unit 14, bypass switches 15 (15-1 to 15-$n$), voltage detection units 16 (16-1 to 16-$n$), and a voltage clamp unit 17.

Electronic components forming parts of the lighting circuit 2 are, for example, arranged on a lighting circuit substrate 2A which is a separate member from the LED substrate 3A of the light source unit 3.

The power source line of the power source voltage V1 and the ground line from the battery provided on the vehicle side are connected to terminals 41, 42 of the lighting circuit 2.

The input filter 11 is provided with respect to the power source voltage V1 applied between the terminals 41, 42. For example, the input filter 11 is provided with a circuit for surge protection, reverse protection, over voltage protection, and the like.

The DC/DC converter 12 is a voltage conversion unit configured to supply the drive current Id to the light source unit 3. The DC/DC converter 12 receives a DC voltage via the input filter 11 and performs voltage conversion so as to generate an output voltage Vd.

The DC/DC converter 12 is, for example, a switching regulator. Depending on a relationship between a forward drop voltage of the light source unit 3 and the power supply voltage V1, the DC/DC converter 12 may be any of a boost converter, a buck converter, or a buck-boost converter.

A current based on the output voltage Vd at an output side of the DC/DC converter 12 flows to the LEDs 30 of the light source unit 3 as the drive current Id.

The converter drive unit 13 performs constant current control of the drive current Id while controlling the DC/DC converter 12 to perform voltage conversion operation.

For example, the converter drive unit 13 compares a current value of the drive current Id with a target current value based on a detection signal SId of an output (drive current Id) of the DC/DC converter 12 so as to generate a PWM control signal Spwm corresponding to a difference. The PWM control signal Spwm is supplied to a switching element of the DC/DC converter 12 to control the voltage conversion operation, so that a constant current output is realized.

The bypass switches 15-1 to 15-$n$ are provided in parallel with respective LEDs 30-1 to 30-$n$ in the lighting circuit 2. The bypass switches 15-1 to 15-$n$ are configured by switching elements such as Metal-Oxide-Semiconductor Field-Effect Transistors (MOCFETs).

Terminals 44-1, 44-2, . . . , 44-($n$+1) are provided on the lighting circuit substrate 2A. The terminals 44-1 and 44-($n$+1) are positive electrode end and negative electrode end on the output side of the DC/DC converter 12. The bypass switches 15-1 to 15-$n$ are connected in series between the terminals 44-1, 44-2, . . . , 44-($n$+1). Connection points of the bypass switches 15-1 to 15-$n$ are led to terminals 44-2, . . . , 44-$n$.

Corresponding to the terminals 44-1, 44-2, . . . , 44-($n$+1), terminals 31-1 to 31-($n$+1) are provided on a side of the LED substrate 3A.

A terminal 31-1 is connected to an anode of a LED 30-1, and a terminal 31-($n$+1) is connected to a cathode of a LED 30-$n$. Connection points of the LEDs 30-1 to 30-$n$ are connected to terminals 31-2 to 31-$n$.

As shown in the figure, each of the terminals 44-1 to 44-($n$+1) is connected to a corresponding terminal of the terminals 31-1 to 31-($n$+1), for example, by a wire between the substrates. Therefore, a bypass switch 15-1 is connected to the LED 30-1 in parallel, a bypass switch 15-2 is connected to a LED 30-2 in parallel, . . . , and a bypass switch 15-$n$ is connected to the LED 30-$n$ in parallel.

When the bypass switch 15-1 is turned on, a bypass path BP1 corresponding to the LED 30-1 is formed. In this case, the drive current Id flows to the bypass path BP1, and the LED 30-1 is not turned on since the drive current Id does not flow thereto. When the bypass switch 15-1 is turned off, the drive current Id flows to the LED 30-1 and the LED 30-1 is turned on.

When the bypass switch 15-2 is turned on, a bypass path BP2 corresponding to the LED 30-2 is formed. In this case, the drive current Id flows to the bypass path BP2, and the LED 30-2 is not turned on. When the bypass switch 15-2 is turned off, the drive current Id flows to the LED 30-2 and the LED 30-2 is turned on.

Similarly, LEDs 30-3 to 30-$n$ can be controlled to be turned on/off by controlling bypass paths BP3 to BPn to be closed/opened via the bypass switches 15-3 to 15-$n$.

The bypass switches 15-1 to 15-$n$ are controlled to be turned on/off via bypass control signals SB1 to SBn from the control unit 14.

The voltage detection units 16-1 to 16-$n$ are connected in series between positive and negative electrodes at the output side of the DC/DC converter 12 (between the terminals 44-1 to 44-$(n+1)$). Connection points of the voltage detection units 16-1 to 16-$n$ are connected to the terminals 44-2 to 44-$n$ respectively.

Therefore, a voltage detection unit 16-1 is connected to the LED 30-1 and the bypass switch 15-1 in parallel, a voltage detection unit 16-2 is connected to the LED 30-2 and the bypass switch 15-2 in parallel . . . and a voltage detection unit 16-$n$ is connected to the LED 30-$n$ and the bypass switch 15-$n$ in parallel.

Therefore, each of the voltage detection units 16-1 to 16-$n$ detects a voltage between an anode and a cathode of a corresponding LED 30 in parallel therewith. Then, voltage detection signals DT1 to DTn are supplied to the control unit 14.

For example, the voltage detection unit 16-1 detects an ON voltage of the LED 30-1 when the LED 30-1 is turned on and transmits a voltage detection signal DT1 of a low level. When the LED 30-1 is turned off (the bypass switch 15-1 is turned on), a voltage lower than the ON voltage of the LED 30-1 (a voltage corresponding to an ON-resistance of the bypass switch 15-1) is detected, and a voltage detection signal DT1 of a high level is transmitted. Such a detection signal DT1 is supplied to the control unit 14. Similarly, voltage detection units 16-2 to 16-$n$ supply voltage detection signals DT2 to DTn representing voltages corresponding to states of corresponding LEDs and bypass paths are supplied to the control unit 14.

Here, in a case where a certain x-th bypass switch 15-$x$ is controlled to be turned off by the control unit 14, although an output voltage detection signal DTx should be a low level representing an ON voltage of a LED, if the voltage detection signal DTx is a high level, an abnormality of short circuit of a LED 30-$x$ can be recognized.

Also, in a case where the x-th bypass switch 15-$x$ is controlled to be turned on by the control unit 14, although an input voltage detection signal DTx should be a high level, if the voltage detection signal DTx is a low level, a control abnormality of the LED 30-$x$ or the bypass switch 15-$x$ can be recognized.

Incidentally, the above low level/high level of the voltage detection signals DT1 to DTn is an example, and detection logic may be reversed.

The control unit 14 includes a microcomputer, for example, and controls the converter drive unit 13 and the bypass switches 15-1 to 15-$n$.

A terminal T1 of the control unit 14 is an operating power supply terminal. For example, the power source voltage V1 through the input filter 11 is converted into a predetermined voltage V2 used for the microcomputer via the voltage clamp unit 17 and is supplied as an operating power supply of the control unit 14. Incidentally, the voltage V2 from the voltage clamp unit 17 is also used as a power supply voltage of the converter drive unit 13.

A terminal T2 of the control unit 14 is a terminal for power supply monitoring. That is, the power supply voltage V1 through the input filter 11 is applied to the terminal T2. The control unit 14 can monitor an over voltage state or a low voltage state of the power supply voltage V1 via a voltage of the terminal T2. That is, the control unit 14 can monitor a power supply voltage abnormality.

A terminal T3 of the control unit 14 is a terminal for communicating with the ECU 22. The terminal T3 is connected to the ECU 22 in the vehicle side via a terminal 43 of the lighting circuit substrate 2A. Various turning-on instructions to the control unit 14 including a turning-off instruction and a turning-on instruction of the light source unit 3 are obtained via communication from the ECU 22.

A terminal T4 of the control unit 14 is an output terminal of the control signals SB1 to SBn corresponding to each of the bypass switches 15-1 to 15-$n$.

A terminal T5 of the control unit 14 is an input terminal of the voltage detection signals DT1 to DTn.

A terminal T6 of the control unit 14 is a ground terminal.

A terminal T7 of the control unit 14 is an output terminal of a drive control signal SS. The control unit 14 drives and instructs the converter drive unit 13 via the drive control signal SS. That is, the control unit 14 instructs execution/stop of the voltage conversion operation via the DC/DC converter 12.

Incidentally, during a period when the DC/DC converter is operating, the control unit 14 can variously control a turning-on state by controlling the bypass switches 15-1 to 15-$n$ via the control signals SB1 to SBn.

That is, a LED 30-$x$ is turned off by turning on a corresponding bypass path BPx continuously via a control signal SBx and is turned on by turning off the corresponding bypass path BPx continuously. Also, it is possible to dim the LED 30-$x$ by turning on/off the corresponding bypass path BPx at a high frequency (for example, a few hundred Hz). Further, it is possible to modulate light by changing on duty of on/off control <2. Turning-On Control>

Processing of the control unit 14 when a turning-on instruction of the light source unit 3 is transmitted from the ECU 22 is illustrated with reference to FIGS. 3 and 4A.

Figure 3:
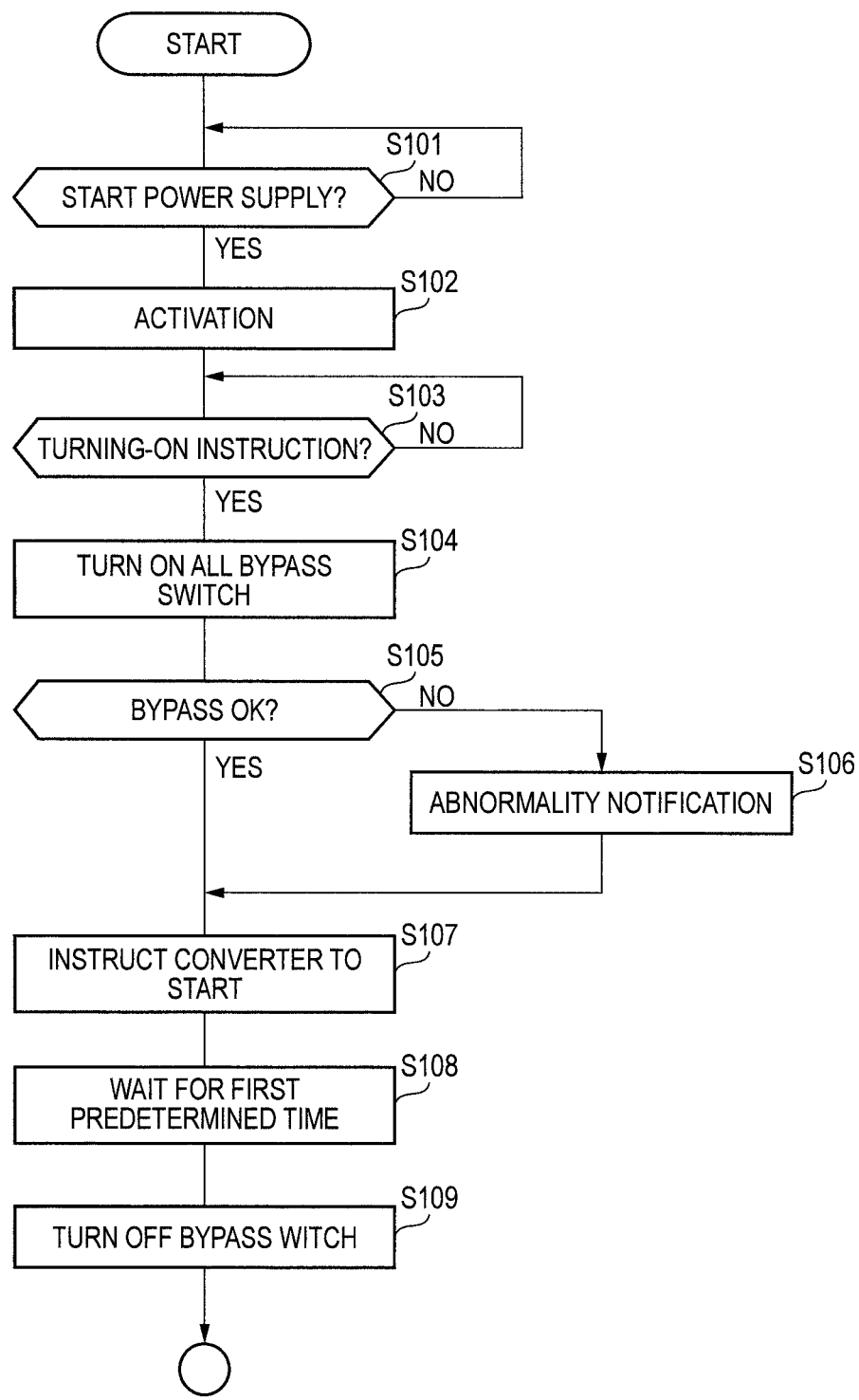
FIG. 3 is a flowchart of turning-on control according to the embodiment.

FIG. 3 is a flowchart of the processing of the control unit 14. When the power source voltage V1 is supplied to the vehicle lamp 1, the voltage V2 for operating the microcomputer is supplied to the terminal T1 via the voltage clamp unit 17. When the voltage V2 is supplied to the terminal T1, the control unit 14 proceeds from step S101 to S102 and performs activation and initialization processing to become an operation state.

After the activation, the control unit 14 waits for a turning-on instruction from the ECU 22 in step S103. When receiving the turning-on instruction, the control unit 14 proceeds to step S104 and controls all of the bypass switches 15-1 to 15-$n$ to be turned on via the control signals SB1 to SBn. Accordingly, the terminals 44-1, 44-$(n+1)$ are connected via the bypass paths BP1 to BPn.

The control unit 14 confirms if all of the bypass switches 15-1 to 15-$n$ are turned on in step S105. Specifically, the control unit 14 confirms if all of the voltage detection signals DT1 to DTn are low levels (a detection state of a voltage lower than an ON voltage of a LED 30).

Then, if a confirming result of the control unit 14 is OK, the control unit 14 proceeds from S105 to step S107, whereas if the confirming result of the control unit 14 is NG, that is, a case where a low level is detected among the voltage detection signals DT1 to DTn, the control unit 14 determines that an abnormality has occurred and performs an abnormality notification to the ECU 22 in step S106. However, in this example, even the abnormality occurs partially, the control unit 14 proceeds to step S107 so as to turn on the light source unit 3.

In S107, the control unit 14 instructs the converter drive unit 13 to start operating via the control signal SS. Accordingly, the converter drive unit 13 starts the voltage conversion operation via the DC/DC converter 12. The output voltage Vd of the DC/DC converter 12 is then obtained, and the drive current Id starts to flow. However, since all of the bypass switches 15-1 to 15-*n* are turned on at this time point, the drive current Id does not flow to the LEDs 30-1 to 30-*n*, and the light source unit 3 are completely off.

After instructing the converter to start operating in step S107, the control unit 14 waits for a first predetermined time in step S108, for example, a period of time considering a time from the activation of the DC/DC converter 12 to a stable output thereof (for example, a several milliseconds to a several hundred milliseconds). After the first predetermined time elapses, the control unit 14 controls the bypass switches 15-1 to 15-*n* to be turned off in step S109. At this time, the drive current Id flows to the LEDs 30-1 to 30-*n*, and the LEDs 30-1 to 30-*n* of the light source unit 3 are turned on.

Figure 4A:
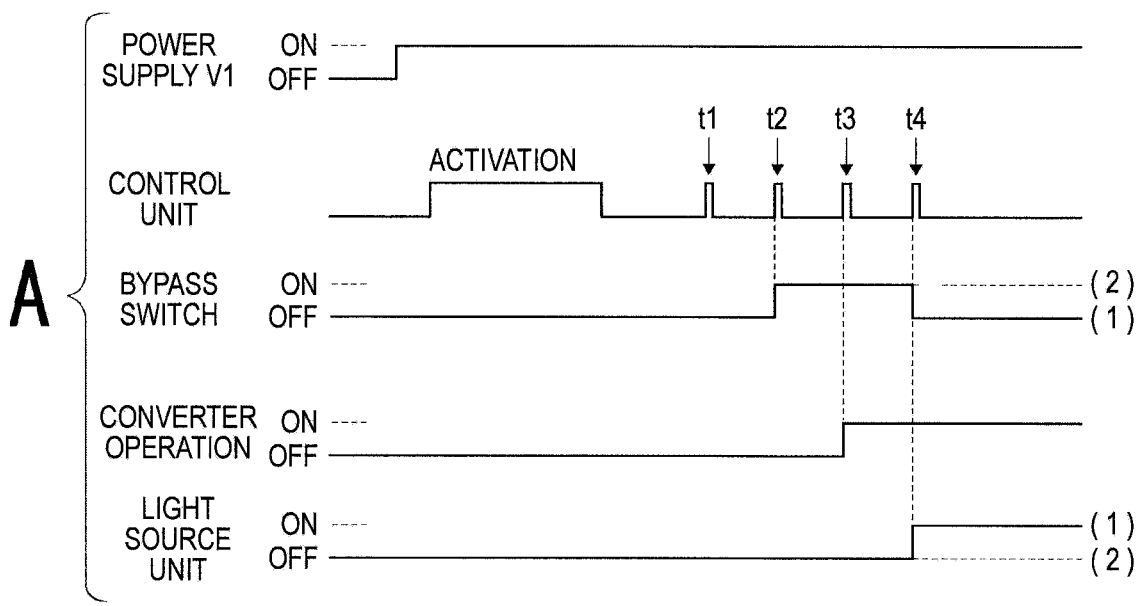
FIGS. 4A and 4B are illustrative diagrams of operation of turning-on and turning-off lighting according to the embodiment.

Operation based on the above processing is shown as a timing chart in FIG. 4A.

The control unit 14 performs the activation processing upon supply of the power source voltage V1. The control unit 14 recognizes a turning-on instruction from the ECU 22, for example, at a time point t1. The control unit 14 turns on the bypass switches 15-1 to 15-*n* at a time point t2. Then the control unit 14 instructs the converter drive unit 13 to start operating and the DC/DC converter 12 to start voltage conversion at a time point t3. The bypass switches 15-1 to 15-*n* are turned off at a time point t4 when supply of the drive current Id via the DC/DC converter 12 is surely started. At this time, the light source unit 3 starts to be turned on which is shown in a solid line (1).

Before the time point t4, since the drive current Id does not flow to the LEDs 30-1 to 30-*n* even if an output thereof is started, no instantaneous lighting and the like occurs regardless of a state of the output voltage Vd.

Incidentally, there is a case where only a part of the bypass switches 15-1 to 15-*n* are turned off when the control unit 14 is in step S109 (time point t4). For example, in a case where there is an instruction from the ECU 22 to selectively turn on a part of the LEDs 30-1 to 30-*n*, a bypass switch 15 corresponding to a LED 30 which should be turned on is turned off. In this case, a bypass switch corresponding to a LED which is not an object of the turning-on instruction continues to be on state represented by a broken line (2), and the corresponding LED is left to be off.

<3. Turning-Off Control>

Next, turning-off control of the control unit 14 will be illustrated with reference to FIGS. 4B and 5.

Figure 5:
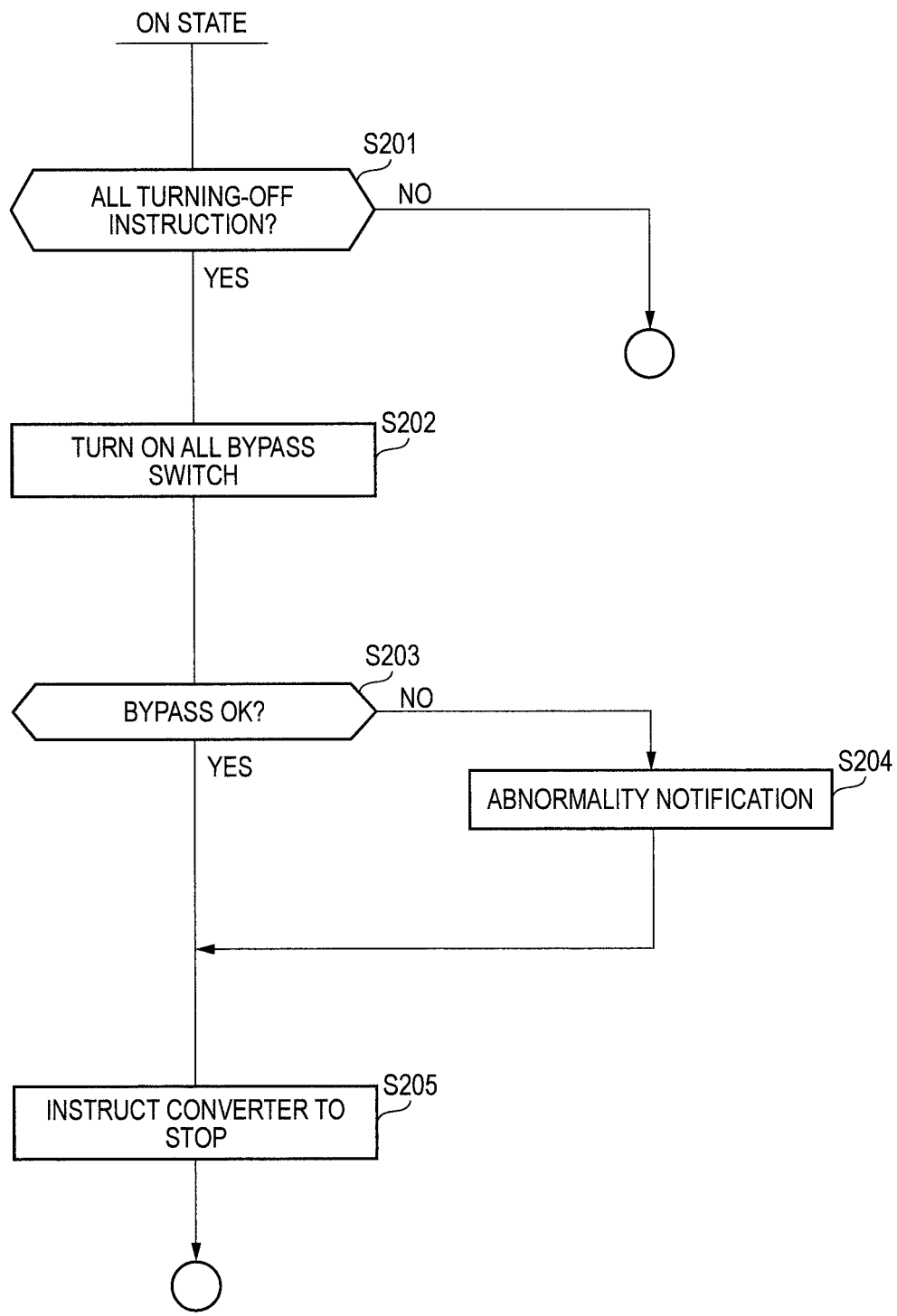
FIG. 5 is a flowchart of turning-off control according to the embodiment.

FIG. 5 shows processing of the control unit 14 when an all turning-off instruction of the light source unit 3 is transmitted from the ECU 22 in a state where all or a part of the LEDs 30-1 to 30-*n* of the light source unit 3 are on.

After the control unit 14 recognizes the all turning-off instruction from the ECU 22 in step S201, the control unit 14 proceeds to step S202 and controls all of the bypass switches 15-1 to 15-*n* to turn into on state. In this way, the LEDs 30-1 to 30-*n* of the light source unit 3 are turned off at the same time.

In step S203, the control unit 14 confirms if all of the bypass switches 15-1 to 15-*n* are turned on. That is, the control unit 14 confirms if all of the voltage detection signals DT1 to DTn are at high levels.

Then, if the confirming result of the control unit 14 is OK, the control unit 14 proceeds from S203 to S205, whereas if the confirming result of the control unit 14 is NG, that is, a case where a low level is detected among the voltage detection signals DT1 to DTn, the control unit 14 determines that an abnormality has occurred and performs an abnormality notification to the ECU 22 in step S204. Then, the control unit 14 proceeds to step S205.

In step S205, the control unit 14 instructs the converter drive unit 13 to stop operating via the control signal SS. Accordingly, the converter drive unit 13 stops the voltage conversion operation of the DC/DC converter 12. Accordingly, the output voltage Vd of the DC/DC converter 12 is not obtained, and the supply of the drive current Id is stopped.

Incidentally, there is a possibility that a LED recognized to be abnormal in step S203 is still on immediately after step S202. However, since the operation of the DC/DC converter 12 is stopped anyway in step S205, the part of LEDs having certain abnormality are turned off.

Figure 4B:
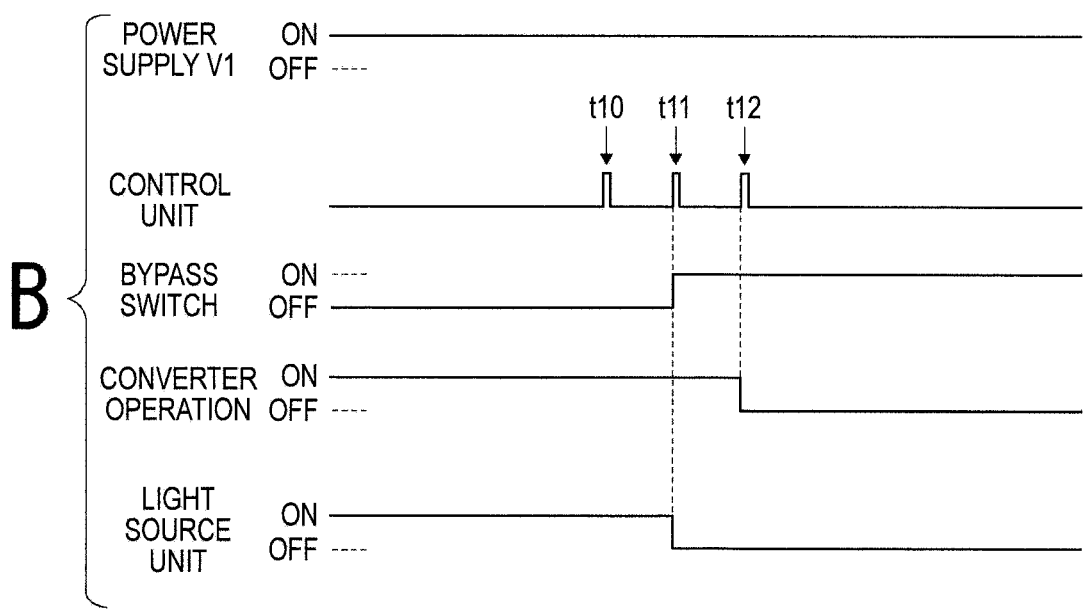

Operation based on the above processing is shown as a timing chart in FIG. 4B.

The control unit 14 recognizes an all turning-off instruction from the ECU 22, for example, at a time point t10. The control unit 14 turns on the bypass switches 15-1 to 15-*n* at a time point t11. Therefore, all of the LEDs 30-1 to 30-*n* are turned off. Then the control unit 14 instructs the converter drive unit 13 to stop operating and the DC/DC converter 12 to stop voltage conversion at a time point t12.

In this way, all turning off timing of the light source unit 3 is the time point 11, and it is possible to realize all turning off of the light source unit 3 instantly regardless of an operation state of the DC/DC converter 12.

Next, a modified example of turning-off control of the control unit 14 will be illustrated with reference to FIG. 6.

Figure 6:
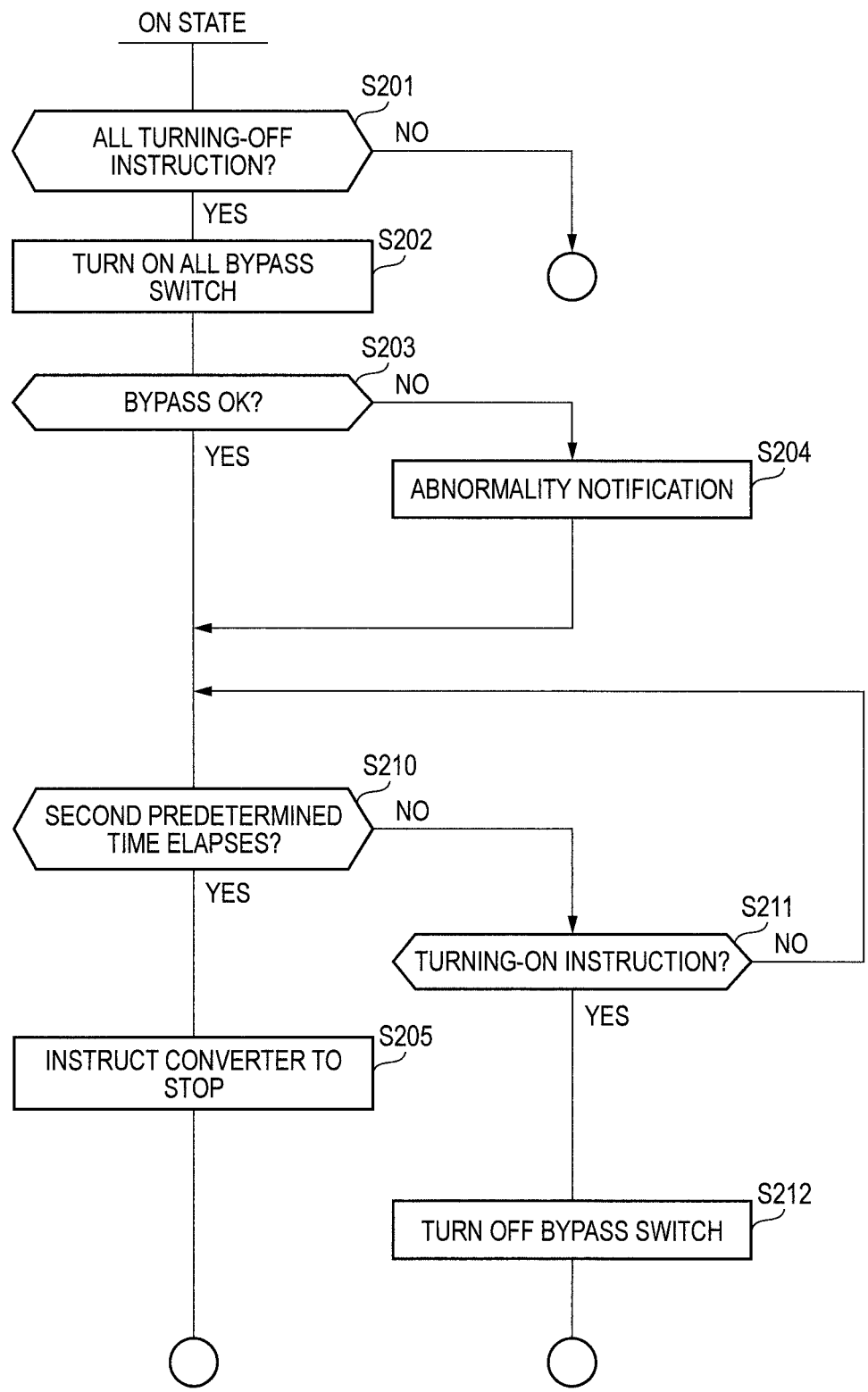
FIG. 6 is a flowchart of turning-off control according to an embodiment.

Steps S201 to S204 in FIG. 6 are the same as those in FIG. 5, and explanation thereof are omitted.

In this example, after all of the bypass switches 15-1 to 15-*n* are turned on in step S202, the control unit 14 monitors if there is a turning-on instruction from the ECU 22 in step S211 while waiting for a second predetermined time to elapse in step S210.

When the second predetermined time elapses, the control unit 14 proceeds to step S205, and the control unit 14 instructs the converter drive unit 13 to stop operating via the control signal SS.

Meanwhile, if a turning-on instruction from the ECU 22 is recognized before the second predetermined time elapses, the control unit 14 proceeds to step S212 and turns off the bypass switches 15-1 to 15-*n*. Incidentally, there is a case where a part of the bypass switches 15-1 to 15-*n* are turned off according to content of the turning-on instruction.

That is, in this example, the DC/DC converter 12 is kept operating for certain time period (the second predetermined time, for example, within a few seconds and the like) even if there is an all turning-off instruction. Since the drive current Id during this time flows to the bypass paths BP1 to BPn, the light source unit 3 is turned off. Then, when there is a turning-on instruction, all or part of the bypass switches 15-1 to 15-$n$ are turned off such that the light source unit 3 is turned on.

<4. Summary and Modified Example>

The lighting circuit 2 according to the embodiments includes the voltage converter 12 which is configured to receive the DC power supply voltage V1 to perform voltage conversion and supply the drive current Id to the light source unit 3, the bypass switches 15-1 to 15-$n$ which form the bypass paths BP1 to BPn through which the drive current Id bypasses the light source unit 3, and the control unit 14 which is configured to control the voltage converter 12 and the bypass switches 15-1 to 15-$n$. When turning on the LEDs 30-1 to 30-$n$ which are the light emitting elements of the light source unit 3, the control unit 14 starts voltage conversion in a state where the bypass switches 15-1 to 15-$n$ are turned on, and then, turns off the bypass switches to turn on the LEDs 30-1 to 30-$n$ (see FIGS. 3 and 4A).

With such control, high-quality turning-on operation is realized.

That is, inconsistency of turning-on timing for each turning-on situation due to a difference in charges remaining in a smoothing capacitor in an output stage of the DC/DC converter 12 when the light source unit is turned on is resolved.

Also, a phenomenon such as instantaneous lighting does not occur, in which an output voltage exceeding a threshold voltage of the LEDs 30-1 to 30-$n$ only for a moment when the DC/DC converter 12 starts operating is generated due to effects by the remaining charges.

Then, turning-on timing of all of the LEDs 30-1 to 30-$n$ can be consistent with turning-off timing of the bypass switches 15-1 to 15-$n$.

In this way, it is possible to realize turning-on operation with a good appearance which does not bring discomfort to a user.

When turning off the light source unit 3, the control unit 14 controls the DC/DC converter 12 to stop voltage conversion after turning on the bypass switches 15-1 to 15-$n$ (see FIGS. 4B and 5).

The light source unit 3 is all turned off at a time point when the bypass paths BP1 to BPn are closed by the bypass switches 15-1 to 15-$n$.

Therefore, it is possible to turn all of the LEDs 30-1 to 30-$n$ off instantaneously. This is useful for a case where it is necessary to perform turning-off instantaneously. For example, in a case where a high beam is to be turned off instantaneously based on control of the ECU 22 when a sudden appearance of an oncoming vehicle is detected, it will be significant effects to be able to turn off lighting instantaneously.

Also, since it is possible to turn off the light source unit 3 instantaneously regardless of the operating state of the DC/DC converter 12, discomfort due to delayed turning-off can be resolved. For example, it is possible to make a turning-off condition for each lighting situation constant without gradual turning off due to a charge state of the smoothing capacitor in the output stage of the DC/DC converter 12, and the appearance thereof is also good.

Since the bypass paths BP1 to BPn are closed when the light source unit 3 is turned off, it is possible to realize discharging of the smoothing capacitor in the output stage of the DC/DC converter 12.

Incidentally, in the above embodiments, although the voltage conversion operation of the DC/DC converter 12 is stopped at a time point after the bypass paths BP1 to BPn are closed, the DC/DC converter 12 may be stopped substantially at the same time as the turning-on control of the bypass switches 15-1 to 15-$n$.

As shown in FIG. 6 as a modified example, when turning off the light source unit 3, the control unit 14 may control the DC/DC converter 12 to stop voltage conversion after turning on the bypass switches 15-1 to 15-$n$ in a case where no turning-on instruction is input even after the second predetermined time.

There is a case where a turning-on instruction is input immediately after a turning-off instruction. In such a case, it is possible to respond instantly if the voltage conversion is not stopped. That is, it is possible to operate effectively when the light is turned on again.

Meanwhile, the power loss is large to continue the voltage conversion and an output of the drive current Id unnecessarily. Accordingly, the control unit 14 waits only for the second predetermined time until the voltage conversion is stopped. Due to setting of the second predetermined time, it is possible to resolve a situation where the waiting becomes unnecessarily long and power consumption is wasted.

In the embodiments, the plurality of LEDs 30-1 to 30-$n$ are connected in series in the light source unit 3, and the bypass paths BP1 to BPn are paths in which the plurality of bypass switches 15-1 to 15-$n$ connected in parallel with the LEDs 30-1 to 30-$n$ are connected in series. When turning on all or a part of the LEDs 30-1 to 30-$n$ of the light source unit 3, the control unit 14 controls the voltage conversion of the DC/DC converter 12 to start in a state where all of the bypass switches 15-1 to 15-$n$ are turned on, and then, turns off all or a part of the bypass switches 15-1 to 15-$n$.

In a case where the plurality of LEDs 30-1 to 30-$n$ are connected in series in the light source unit 3, control of turning on/off the LEDs 30-1 to 30-$n$ can be realized by, for example, providing the bypass switches 15-1 to 15-$n$ in parallel with each of the LEDs 30-1 to 30-$n$. In such a case, when all or a part of the LEDs 30-1 to 30-$n$ are to be turned on from a state where the light source unit 3 is off, bypass paths corresponding to the entire light source unit 3 are closed by turning on all of the bypass switches 15-1 to 15-$n$. In this way, it is possible to realize the above high-quality turning-on operation.

Also, when turning off all of the light emitting elements from a state where at least one of the LEDs 30 is on, the above instantaneous turning-off can be realized by controlling the voltage conversion to stop after closing all of the bypass switches 15-1 to 15-$n$.

In the vehicle lamp 1 according to the embodiments, as shown in FIG. 2, the plurality of LEDs 30-1 to 30-$n$ are arranged in a row. Accordingly, the light emitting elements in a row can be controlled to be turned on and off partially via the bypass switches. For example, it is possible to realize sequential lighting and control of partial light distribution. Therefore, the vehicle lamp 1 is suitable for application as a turn signal lamp performing so-called sequential lighting, or a headlamp performing partial light distribution control, especially a high beam light source.

Also, the lighting circuit 2 includes the voltage detection units 16-1 to 16-$n$ detecting voltages between both ends of each of the LEDs 30-1 to 30-$n$, and the control unit 14 performs abnormality detection of the LEDs 30-1 to 30-$n$ by the voltage detection signals DT1 to DTn of the voltage detection units 16-1 to 16-$n$ and a control state of the bypass switches 15-1 to 15-$n$ (state of the control signals SB1 to SBn). In this way, it is possible to determine an abnormality of short circuit of the LEDs 30 appropriately and notify the ECU 22.

The present invention is not limited to the above embodiments, and various modifications are conceivable. The configuration of the lighting circuit 2 is not limited to the configuration example shown in FIG. 1. Also, the control processing of the control unit 14 is also not limited to the examples of FIGS. 3, 5, and 6. A lighting circuit performing one of the turning-on control as shown in FIG. 3 and the turning-off control in FIG. 5 or 6 may be considered.

DESCRIPTION OF REFERENCE NUMERALS

1 vehicle lamp
2 lighting circuit
3 light source unit
12 DC/DC converter
13 converter drive unit
14 control unit
15-1 to 15-n bypass switch
16-1 to 16-n voltage detection unit
30-1 to 30-n LED

The invention claimed is:

1. A lighting circuit comprising:
a voltage converter configured to receive a DC voltage to perform voltage conversion and supply a drive current to a light source unit including a light emitting element;
a bypass switch configured to form a bypass path through which the drive current bypasses the light emitting element; and
a controller configured to control the voltage converter and the bypass switch,
wherein the light source unit includes a plurality of light emitting elements connected in series,
wherein the bypass path includes at least one bypass switch which are connected in parallel with at least one of the light emitting elements, and
wherein, when turning on the light emitting element of the light source unit from a state in which the bypass switch is turned on and the voltage converter is not operating, the controller instructs the voltage converter to start operating and, after a first predetermined time has elapsed, turns off the bypass switch to turn on the light emitting element.

2. A lighting circuit comprising:
a voltage converter configured to receive a DC voltage to perform voltage conversion and supply a drive current to a light source unit including a light emitting element;
a bypass switch configured to form a bypass path through which the drive current bypasses the light emitting element; and
a controller configured to control the voltage converter and the bypass switch,
wherein the light source unit includes a plurality of light emitting elements connected in series,
wherein the bypass path includes at least one bypass switch which are connected in parallel with at least one of the light emitting elements,
wherein, when turning on the light emitting element of the light source unit, the controller turns off the bypass switch to turn on the light emitting element in a state where the bypass switch is turned on, and after instructing the voltage converter to start operating and after a first predetermined time has elapsed, and
wherein, when turning off the light emitting element of the light source unit, the controller controls the voltage conversion to stop after turning on the bypass switch and after a second predetermined time has elapsed.

3. The lighting circuit according to claim 1,
wherein the bypass path includes a plurality of bypass switches which are connected in parallel with the light emitting elements and are connected in series, and
wherein, when turning on all or a part of the light emitting elements in the light source unit, the controller controls the voltage conversion to start in a state where all of the bypass switches are turned on, and then, turns off all or a part of the bypass switches.

4. A lighting circuit comprising:
a voltage converter configured to receive a DC voltage to perform voltage conversion and to supply a drive current to a light source unit which includes a plurality of light emitting elements connected in series;
a bypass path which includes a plurality of bypass switches which are connected in parallel with the light emitting elements and are connected in series; and
a controller configured to control the voltage converter and the bypass switches,
wherein, when turning off all of the light emitting elements from a state where at least one light emitting element is on, the controller controls the voltage converter to stop operating after turning on all of the bypass switches, and
wherein, when turning off the light emitting element of the light source unit, the controller controls the voltage conversion to stop after turning on the bypass switch and after a second predetermined time has elapsed.

5. The lighting circuit according to claim 4,
wherein, when turning off all of the light emitting elements, the controller controls the voltage conversion to stop in a case where no turning-on instruction is input even after a second predetermined time elapses from turning on of all of the bypass switches.

6. A vehicle lamp comprising:
the light source unit and the lighting circuit according to claim 1.

7. A vehicle lamp comprising:
the light source unit and the lighting circuit according to claim 4.

* * * * *